United States Patent
Sheridan

(10) Patent No.: US 11,100,005 B2
(45) Date of Patent: Aug. 24, 2021

(54) LOGICAL-TO-PHYSICAL (L2P) TABLE SHARPING STRATEGY

(71) Applicant: Micron Technology, Inc., Boise, ID (US)

(72) Inventor: Patrick Michael Sheridan, Boulder, CO (US)

(73) Assignee: MICRON TECHNOLOGY, INC., Boise, ID (US)

(*) Notice: Subject to any disclaimer, the term of this patent is extended or adjusted under 35 U.S.C. 154(b) by 12 days.

(21) Appl. No.: 16/563,628

(22) Filed: Sep. 6, 2019

(65) Prior Publication Data

US 2021/0073139 A1    Mar. 11, 2021

(51) Int. Cl.
*G06F 12/1009* (2016.01)
*G06F 12/06* (2006.01)

(52) U.S. Cl.
CPC ...... *G06F 12/1009* (2013.01); *G06F 12/0646* (2013.01); *G06F 2212/657* (2013.01)

(58) Field of Classification Search
CPC ............. G06F 12/1009; G06F 12/0646; G06F 2212/657
See application file for complete search history.

(56) References Cited

U.S. PATENT DOCUMENTS

2017/0322888 A1* 11/2017 Booth .................. G06F 3/0607

OTHER PUBLICATIONS

Ostrouchov, Susan "Block Cyclic Data Distribution" [online] Fri Apr. 28, 1995 09:37:26 EDT. Retrieved on Nov. 6, 2020 Retrieved from <URL: http://www.netlib.org/utk/papers/factor/node3.html> (Year: 1995).*

* cited by examiner

*Primary Examiner* — David Yi
*Assistant Examiner* — Dustin B. Fulford
(74) *Attorney, Agent, or Firm* — Nicholson De Vos Webster & Elliott LLP

(57) ABSTRACT

A method for managing logical-to-physical (L2P) mappings in a memory subsystem is described. The method includes updating, by a set of processing units, an L2P table based on a set of journal pages from the non-volatile memory. The L2P table prior to the update includes a first set of entries from a table snapshot and the table includes a second set of entries following the update from a set of journal pages. Each L2P table entry (1) corresponds to a logical address in a set of logical addresses and (2) includes a physical address of a set of memory components. The set of logical addresses are categorized into zones and each processing unit is assigned to a separate zone such that each processing unit updates the first set of entries based on an assigned zone of a corresponding logical address and each zone includes at least two non-contiguous logical addresses.

15 Claims, 10 Drawing Sheets

LOGICAL-TO-PHYSICAL (L2P) TABLE SHARPING STRATEGY

TECHNICAL FIELD

The present disclosure generally relates to logical-to-physical (L2P) tables, and more specifically, relates to an L2P table sharding strategy.

BACKGROUND ART

A memory subsystem can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
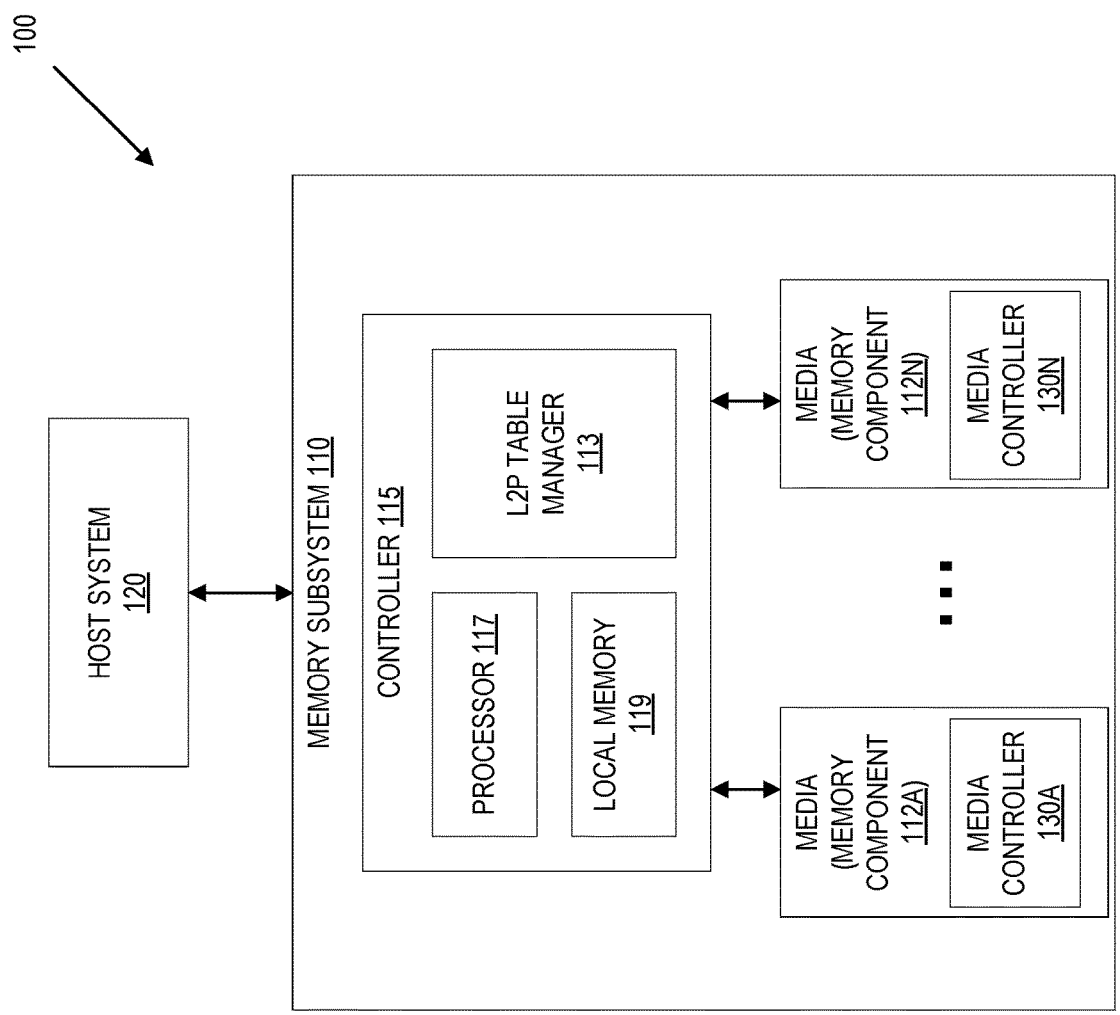
FIG. 1 illustrates an example computing environment that includes a memory subsystem in accordance with some embodiments of the present disclosure.

Aspects of the present disclosure are directed to assigning logical addresses in a logical-to-physical (L2P) table to zones based on non-contiguous addresses and/or chunks of addresses in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more memory devices. The memory devices can include, for example, non-volatile memory devices, such as negative-AND (NAND) memory devices and write-in place memory devices, such as three-dimensional cross-point ("3D cross-point") memory device, which is a cross-point array of non-volatile memory cells. Other types of memory devices, including volatile memory devices, are described in greater detail below in conjunction with FIG. 1. The host system can provide data to be stored at the memory subsystem and can request data to be retrieved from the memory subsystem.

In a conventional memory subsystem, a controller of the memory subsystem utilizes a logical-to-physical (L2P) table to map (1) logical addresses referenced by host systems and (2) physical addresses of memory devices of the memory subsystem. For example, in a flash memory subsystem, the controller does not overwrite a previously written physical location in the memory components (e.g., a cell in the memory components of the flash memory subsystem) in response to a write request but instead writes to a next free physical location in the memory components. Accordingly, when a host system references the logical memory address $L_1$ in a write request passed by the host system to the flash memory subsystem, an L2P table of the flash memory subsystem could initially map this logical memory address $L_1$ to the physical address $P_1$ in the flash memory components (i.e., the L2P table reflects a previous mapping of the logical address $L_1$). However, since the flash memory subsystem cannot write to the physical address $P_1$ to fulfill the write request based on a design of the flash memory subsystem, the flash memory subsystem will instead write to the free physical address $P_2$ and remap the logical memory address $L_1$ in an entry of the L2P table from the physical address $P_1$ to the physical address $P_2$. Accordingly, when a host system requests data based on the logical address $L_1$, the memory subsystem will understand that the corresponding data resides at the physical address $P_2$ based on the entry of the L2P table. As described in this example, the L2P table tracks mappings between logical addresses referenced by host systems and physical addresses of locations in the memory components of the memory subsystem. Although described in relation to a flash memory subsystem, other memory subsystems can utilize L2P tables in similar fashions for logical-to-physical memory address mappings.

While L2P tables are critical for memory subsystems to track logical-to-physical memory mappings, L2P tables can require a considerable amount of memory space to store. For instance, an L2P table can occupy one gigabyte of storage per terabyte of corresponding memory component storage. Traditionally, L2P tables are stored/utilized in volatile memory (e.g., in Dynamic Random-Access Memory (DRAM)). As a result, L2P tables in volatile memory are lost upon the memory subsystem losing power (either an intentional or unintentional loss of power). To address this issue, memory subsystems periodically backup L2P tables in non-volatile memory. However, due to the size of L2P tables and the lack of time during a loss-of-power event, reliably writing an entire L2P table from non-volatile memory to volatile memory of the memory subsystem during a power loss event is impractical (i.e., since an L2P table can be a gigabyte or more in size, the memory subsystem does not have enough time to directly copy the L2P table from volatile memory to non-volatile memory between the memory subsystem detecting a loss of power event and the memory subsystem completely losing power). To address this issue, an L2P table can be split into separate zones/shards (i.e., partitions in the L2P table), where each zone comprises or represents a contiguous set of logical addresses. For example, the memory subsystem can set a first zone to logical addresses 1-100 in an L2P table, a second zone to logical addresses 101-200 in the L2P table, and a third zone to logical addresses 201-300 in the L2P table. In this configuration, the memory subsystem separately and periodically backs-up the separate zones of the L2P table to non-volatile memory using a combination of snapshots of the zones (i.e., complete copies of these zones of the L2P table) and journal page buffers/pages corresponding to each zone (i.e., a separate journal page buffer for each zone is maintained that reflects the changes to the zone in the L2P table stored in volatile memory since a last snapshot was written to non-volatile memory). For example, at a particular interval (e.g., every five seconds), a snapshot of a particular zone of the L2P table can be written to the non-volatile memory. Between the memory subsystem writing snapshots of a zone of the L2P table to non-volatile memory, the memory subsystem maintains a journal page buffer for the zone corresponding to changes to the zone. Once the journal page buffer of a zone has reached a particular size (e.g., 16 kilobytes) or upon occurrence of another event (e.g., upon the elapse of a particular interval), the journal page buffer for the zone is written to non-volatile memory as a journal page and the memory subsystem reinitiates the journal page buffer to track changes to the zone of the L2P table. In this approach, the journal pages in non-volatile memory reflect changes to corresponding zones of the L2P table since a last snapshot of the zone is written by the memory subsystem to non-volatile memory. Further, in this system, each zone can be assigned to a different processing unit (e.g., a processor or a core) such that an assigned processing unit is designated to back up and recreate assigned zones of the L2P table upon a reinitialization of the memory subsystem (e.g., the memory subsystem regaining power). Accordingly, (1) the memory subsystem controls backing up the L2P table in more manageable parts (i.e., based on zones of contiguous logical addresses) that can be distributed to processing units and (2) after a power loss event, assigned processing units of the memory subsystem can recreate each zone of the L2P table using the latest/most recent snapshot and set of journal pages of each zone. However, based on the typically sequential nature of host system workloads, a majority of changes to an L2P table will correspond to a single zone in the L2P table. Namely, host systems (in particular, corresponding applications of these host systems) will more likely reference a contiguous set of logical addresses during a set period/workload, which will correspond to a single zone in the L2P table based on the contiguous nature of addresses in each zone. Thus, generating and recovering the L2P table cannot be easily distributed across a set of processing units, as changes are likely being made to a single zone in the L2P table. Further, since the above scheme relies on a dedicated journal page buffer per zone in the L2P table, considerable overhead is incurred for management of each of these journal page buffers.

Aspects of the present disclosure address the above and other deficiencies by dividing the L2P table using a non-contiguous separation of logical addresses and a single journal page buffer for the L2P table. For example, logical addresses of the L2P table are assigned to zones according to a round-robin approach. In one embodiment, an L2P table manager implements this round-robin approach based on a modulus of logical addresses. For instance, the modulus of a logical address using a set/designated number of zones in the L2P table indicates the assignment of the logical address to a zone. For example, using this approach, logical addresses (LA) are distributed among eight zones as follows: Zone 0 includes LA0, LA8, and LA16; Zone 1 includes LA1, LA9, and LA17; Zone 2 includes LA2, LA10, and LA18, etc. A random workload from a host system will target these zones of non-contiguous logical addresses in a random fashion and only a pathological workload from a host system would hit the same zone sequentially. However, this approach can be sub-optimal as it neglects the benefits of spatial locality when reading entries in journal pages from non-volatile memory. Namely, although there is benefit in distributing logical addresses amongst zones in a strict round-robin approach such that reconstruction of the L2P table can be similarly distributed amongst a set of processing units, efficiency can still be gained by allowing some continuity/locality amongst logical addresses. In particular, efficiency can be gained by allowing processing units to concurrently update a set of continuous logical addresses in the L2P table instead of a single logical address at a time. To address the benefits of spatial locality, in some embodiments, the logical address space can be divided into chunks that are sequential/contiguous and these chunks are distributed/assigned to zones in a round-robin fashion. For example, the L2P table manager can assign logical addresses to zones in the L2P table based on a chunk length/size and the number of zones. For instance, the L2P table manager assigns logical addresses to zones according to Equation 1.

$$\text{Zone}=[\text{LogicalAddress}\div\text{ChunkLength}] \text{ modulus NumberOfZones} \quad \text{Equation 1}$$

For example, using this approach, logical addresses (LA) are distributed among eight zones with a chunk size of three as follows: Zone 0 includes LA0, LA1, LA2, LA24, LA25, and LA26; Zone 1 includes LA3, LA4, LA5, LA27, LA28, and LA29; Zone 2 includes LA6, LA7, LA8, LA30, LA31, and LA32, etc. By relying on Equation 1 above to indicate assignment of logical addresses to zones, this proposed zone scheme also enables a single journal page buffer to be used rather than maintaining a journal page buffer per zone of the L2P table. If a single journal page buffer is used, each journal page read back from non-volatile memory during reconstruction of the L2P table will contain an approximately equal number of entries targeted at each zone of the L2P table. Multiple processing units can read from journal pages upon an L2P table manager loading these journal pages to volatile memory (e.g., when the memory subsystem regains power) and can ignore entries not assigned to the processing unit. This approach potentially yields faster ready times for L2P tables by more evenly distributing entries in journal pages among zones in a zoned L2P table while still taking advantage of spatial locality amongst logical addresses and without potential coherency issues (i.e., since each processing unit handles a separate zone, conflicting updates to entries in the L2P table are avoided). Further, this approach also reduces memory/overhead requirements through the use of a single journal page buffer for all zones in an L2P table. In particular, in response to an asynchronous power loss event, the L2P table manager is responsible for flushing a single journal page buffer instead of a separate journal page buffer for each zone in the L2P table.

FIG. 1 illustrates an example computing environment 100 that includes a memory subsystem 110 in accordance with some embodiments of the present disclosure. The memory subsystem 110 can include media, such as memory components 112A to 112N (also referred to as "memory devices"). The memory components 112A to 112N can be volatile memory components, non-volatile memory components, or a combination of such. A memory subsystem 110 can be a storage device, a memory module, or a hybrid of a storage device. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile DIMM (NVDIMM).

The computing environment 100 can include a host system 120 that is coupled to one or more memory systems 110. In some embodiments, the host system 120 is coupled to different types of memory subsystems 110. FIG. 1 illustrates one example of a host system 120 coupled to one memory subsystem 110. The host system 120 uses the memory subsystem 110, for example, to write data to the memory subsystem 110 and read data from the memory subsystem 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. Examples of a physical host interface include, but are not limited to, a serial advanced technology attachment (SATA) interface, a peripheral component interconnect express (PCIe) interface, USB interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs), multi-level cells (MLCs), triple level cells (TLCs), or quad-level cells (QLCs). In some embodiments, a particular memory component 112A to 112N can include both an SLC portion of memory cells and a portion of memory cells of another type (e.g., MLC, TLC, QLC, etc.). Each of the memory cells can store one or more bits of data used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped to form pages, which can refer to a unit of a memory component 112A to 112N used to store data. With some types of memory (e.g., NAND), pages can be grouped to form blocks.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

Any one of the memory components 112A to 112N can include a media controller (sometimes referred to as a local controller) (e.g., media controller 130A and media controller 130N) to manage the memory cells of the memory component 112, to communicate with the memory subsystem controller 115, and to execute memory requests (e.g., read or write) received from the memory subsystem controller 115.

The memory subsystem 110 includes an L2P table manager 113 that can manage backing up and reconstructing a zoned L2P table following a power loss event. In some embodiments, the controller 115 includes at least a portion of the L2P table manager 113. For example, the controller 115 can include a processor 117 (processing device) configured to execute instructions stored in local memory 119 for performing the operations described herein. In some embodiments, the L2P table manager 113 is part of the host system 110, an application, or an operating system. Further details with regards to the operations of the L2P table manager 113 are described below.

In some embodiments, the memory components 112A to 112N can be managed memory devices (e.g., managed NAND), which is a raw memory device combined with a local controller (e.g., media controller 130) for memory management within the same memory device package. A media controller 130 can include the L2P table manager 113.

As used herein, an L2P table stores mapping of logical addresses to physical addresses. The logical addresses can encompass a translation unit such that the L2P table stores mapping of translation units to physical addresses (i.e., each entry in the L2P table is a mapping of a translation unit to a physical address). In some embodiments, a single translation unit corresponds to multiple logical block addresses, while in other embodiments, a single translation unit corresponds to a single logical block address.

Figure 2:
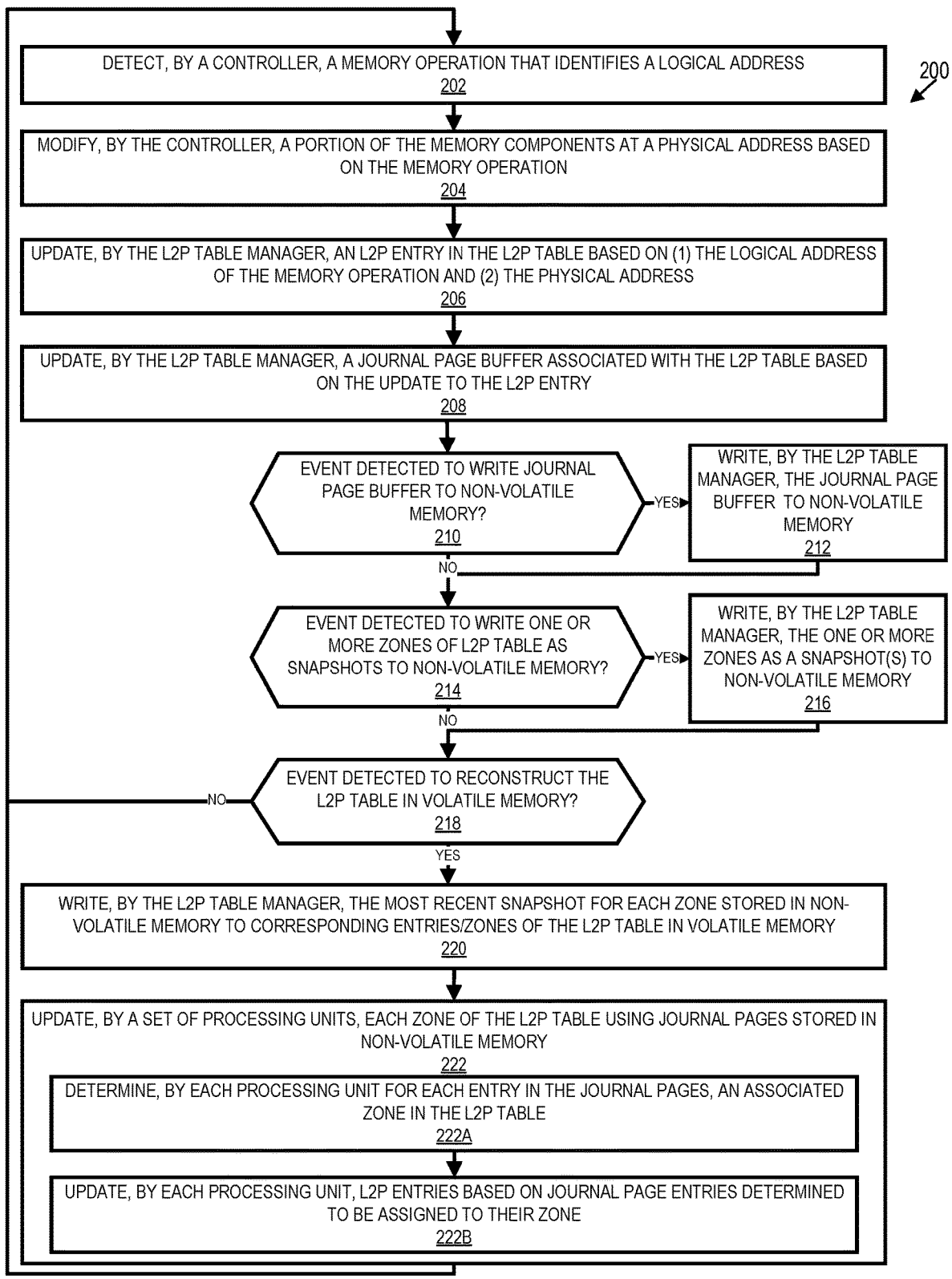
FIG. 2 is a flow diagram of an example method to manage a logical-to-physical (L2P) table, in accordance with some embodiments of the present disclosure.

FIG. 2 is a flow diagram of an example method 200 to manage an L2P table, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the L2P table manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 3A:
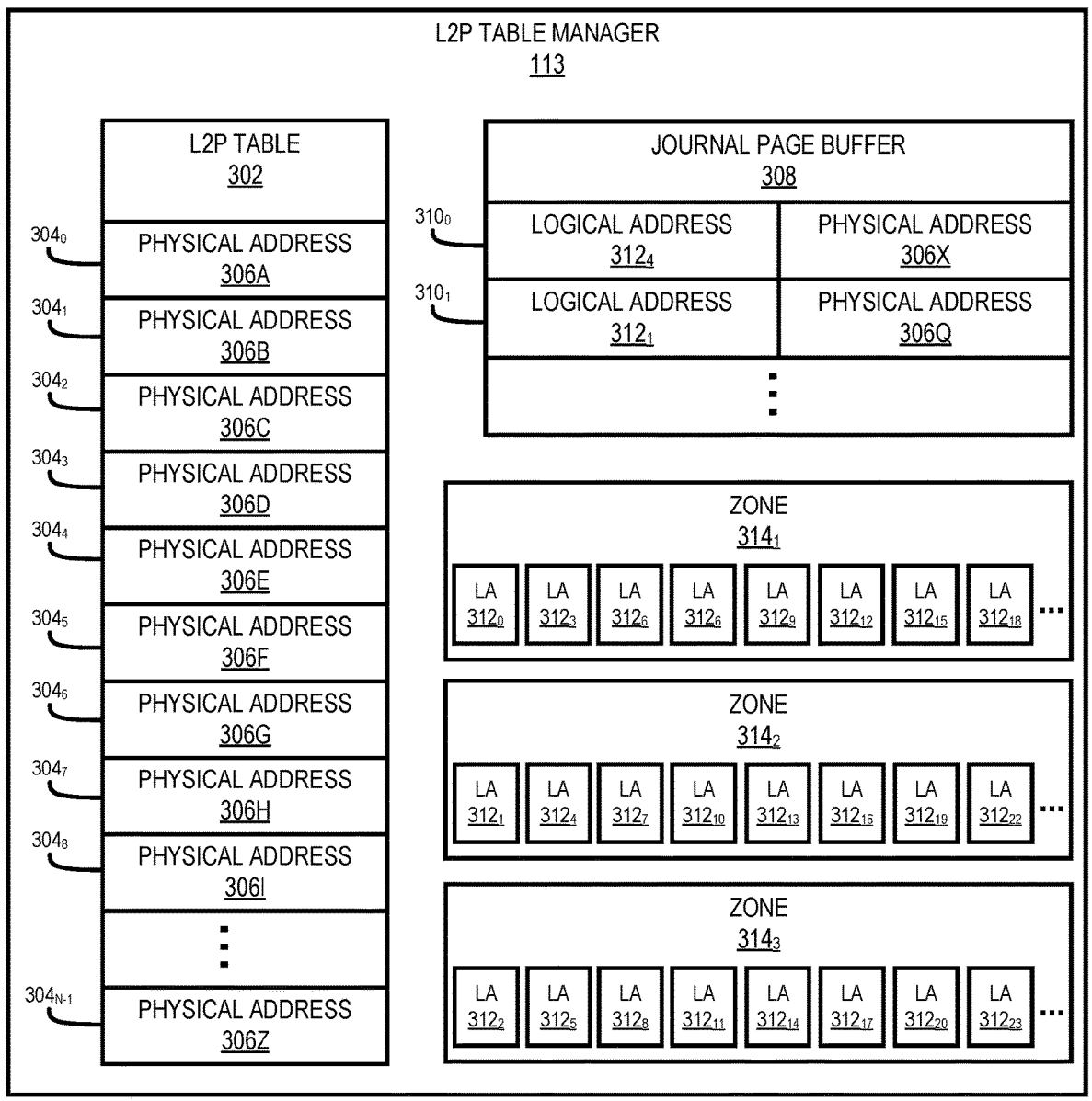
FIG. 3A illustrates an L2P table manager for managing an L2P table based on a set of zones, where the zones are arranged according to a strict round-robin distribution of logical addresses to zones, in accordance with some embodiments of the present disclosure.

At operation 202, the processing device detects a memory operation that identifies a logical address. For example, the processing device can detect a write request from a host system 120 that requests the writing of data to a logical address. As will be described in greater detail below, the logical address corresponds to a location in the memory components 112A to 112N. For instance, FIG. 3A shows the L2P table manager 113, according to one example embodiment. As shown in FIG. 3A, the L2P table manager 113 includes an L2P table 302, which can be stored in the local memory 119. The L2P table 302 includes a set of entries $304_0$-$304_{N-1}$ (sometimes referred to as L2P entries $304_0$-$304_{N-1}$ or L2P table entries $304_0$-$304_{N-1}$), each entry including/identifying a physical address 306A-306Z of the memory components 112A to 112N. In this embodiment, each entry $304_0$-$304_{N-1}$ corresponds to a separate logical address and the physical address 306 included/identified by each entry 304 indicates a mapping of the logical address to the physical address 306 of the memory components 112A to 112N. For example, the entry $304_0$ can correspond to the logical address "0000" and is mapped to the physical address 306A (e.g., the physical address 306A could be "1010" in the memory components 112A to 112N), the entry $304_1$ can correspond to the logical address "0001" and is mapped to the physical address 306B (e.g., the physical address 306B could be "1100" in the memory components 112A to 112N), the entry $304_2$ can correspond to the logical address "0010" and is mapped to the physical address 306C (e.g., the physical address 306C could be "0000" in the memory components 112A to 112N), etc.

At operation 204, the processing device modifies a portion of the memory components 112A to 112N at a physical address 306 based on the detected memory operation. For example, when the memory operation is a write request, the processing device can write data identified by the write request to a location/physical address 306 in the memory components 112A to 112N. For instance, the processing device can write the data identified by the write request to the next free location/physical address 306 of the memory components 112A to 112N at operation 204.

At operation 206, the processing device updates an L2P entry 304 in the L2P table 302 based on (1) the logical address identified by the memory operation detected at operation 202 and (2) the physical address 306 used to modify the memory components 112A to 112N at operation 204. In particular, as noted above, the L2P table 302 identifies mappings between logical addresses, which are used by host systems 120, and physical addresses 306, which are used by the processing device to identify locations in the memory components 112A to 112N. Accordingly, when the processing device modifies the memory components 112A to 112N at a particular physical address 306 based on a memory operation (e.g., a write request) that identifies a logical address, the processing device updates the L2P table 302 at operation 206 to represent the new mapping. For example, when the memory operation of operation 202 is a write request, the processing device sets the physical address 306 of the entry 304 in the L2P table 302 corresponding to the logical address of the write request to the physical address 306 written at operation 204.

Figure 3B:
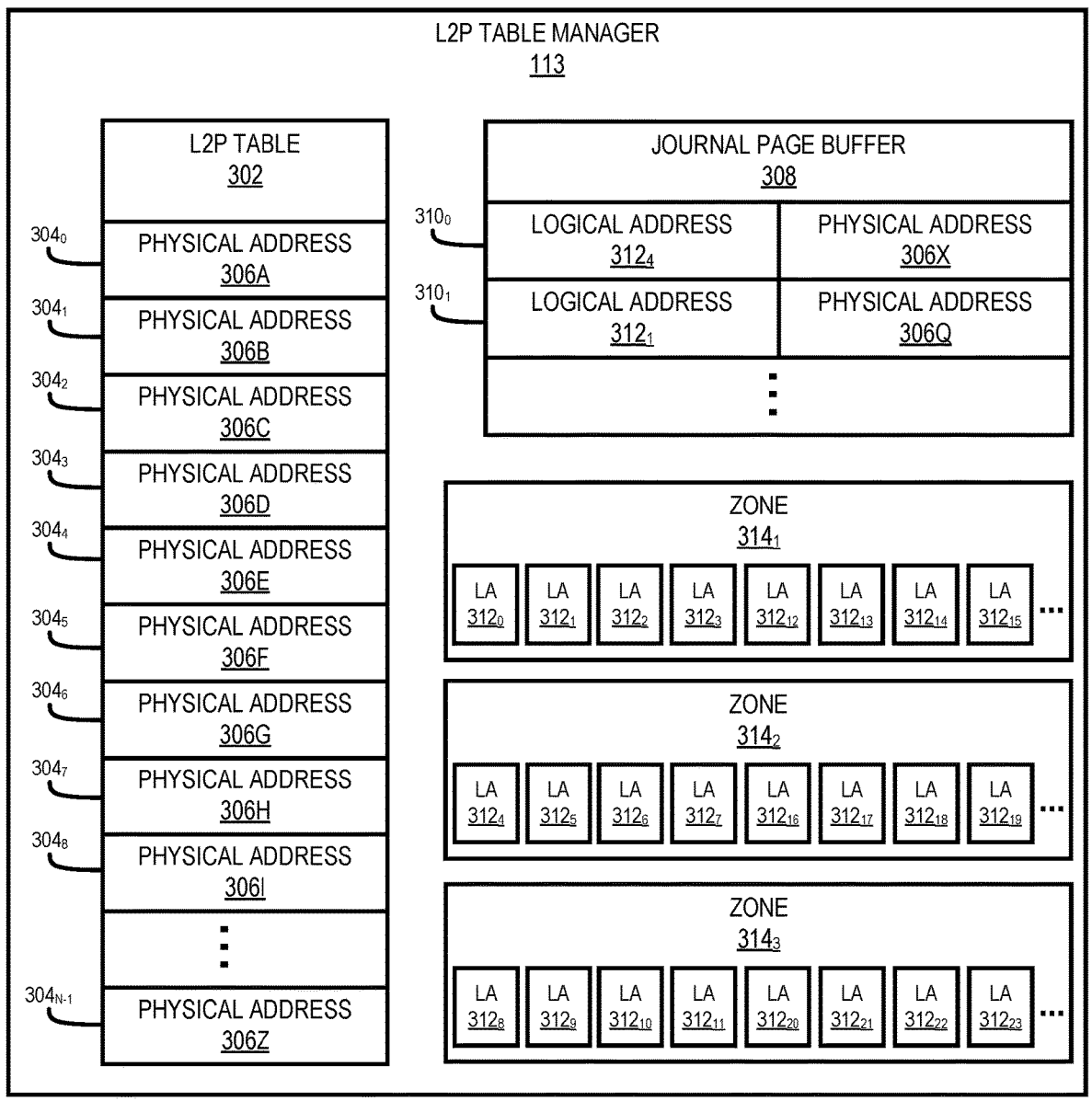
FIG. 3B illustrates an L2P table manager for managing an L2P table based on a set of zones, where the zones are arranged according to contiguous chunks of logical addresses and a round-robin distribution of chunks of logical addresses to zones, in accordance with some embodiments of the present disclosure.

As shown in FIG. 3A, the logical addresses (LAs) 312, which correspond to entries 304 of the L2P table 302, are split/assigned to different zones 314. For example, logical addresses 312 of the L2P table 302 are assigned to zones 314 according to a strict round-robin approach. In one embodiment, the processing device implements this round-robin approach based on a modulus of logical addresses 312. For instance, the modulus of a logical address 312 using a set/designated number of zones 314 (e.g., three zones $314_1$-$314_3$, as shown in FIG. 3A) indicates the assignment of the logical address 312 to a zone 314. However, as noted above, this approach can be sub-optimal as it neglects the benefits of spatial locality when later reading entries 310 from the journal page buffer 308 from non-volatile memory to reconstruct the L2P table 302. In some embodiments, the logical address 312 space can be divided into chunks of logical addresses that are sequential. In particular, the chunks are contiguous sets of logical addresses and the chunks are distributed/assigned to zones 314 using a round-robin approach. Accordingly, each zone 314 includes logical addresses 312 that are contiguous and logical addresses 312 that are non-contiguous. For example, the processing device can assign logical addresses 312 to zones 314 based on a chunk length/size and the number of zones 314. For instance, the processing device can assign logical addresses 312 to zones 314 according to Equation 1 shown above. FIG. 3B shows an example in which three zones $314_1$-$314_3$ and a chuck length/size of four is being utilized in conjunction with Equation 1 to assign logical addresses 312 to zones 314. In this example, the zone $314_1$ includes the logical addresses $312_0$-$312_3$, $312_{12}$-$312_{15}$, etc.; the zone $314_2$ includes the logical addresses $312_4$-$312_7$, $312_{16}$-$312_{19}$, etc.; and the zone $314_3$ includes the logical addresses $312_8$-$312_{11}$, $312_{20}$-$312_{23}$, etc. For purposes of illustration, the embodiment of FIG. 3B will be used to further explain the method 200. However, in some embodiments, the assignment of logical addresses 312 to zones 314 in a strict round-robin approach, as shown in FIG. 3A, can be used.

Although described as assignment, the distribution of logical addresses 312 to zones 314 is passive until reconstruction of the L2P table 302 is needed. Namely, the underlying definition/technique mapping logical addresses 312 to zones 314 is not involved in fulfilling memory requests to host systems 120 or backing up the L2P table 302 in non-volatile memory. Instead, as will be described below, the mapping of logical addresses 312 to zones 314 is reserved for reconstruction of the L2P table 302.

At operation 208, the processing device updates a journal page buffer associated with the L2P table 302 based on the update to the L2P table 302. The journal page buffer is used to record updates to the L2P table 302 since the last/most recent snapshot of the L2P table 302 was stored in non-volatile memory. As shown in FIG. 3B (and also FIG. 3A), the L2P table manager 113 includes a journal page buffer 308. The journal page buffer 308 includes a set of entries 310 (sometimes referred to as journal page buffer entries 310 or journal entries 310) and each entry 310 includes a logical address 312 and a physical address 306 that collectively represent a modification to the L2P table 302. For instance, the example journal page buffer 308 of FIG. 3B (and also FIG. 3A) includes (1) the entry $310_0$ that has the logical address $312_4$ and the physical address 306X and (2) the entry $310_1$ that has the logical address $312_1$ and the physical address 306Q. In this example, the journal page buffer 308 indicates that the processing device updated the L2P table 302 since the last/most recent snapshot of the L2P table 302 was stored in non-volatile memory to include a mapping of (1) the logical address $312_4$ to the physical address 306X and (2) the logical address $312_1$ and the physical address 306Q. As will be described in greater below, the L2P table manager 113, including the L2P table 302 and the journal page buffer 308, are stored in volatile memory, which is susceptible to data loss upon a power loss event (i.e., the contents/entries 304 of the L2P table 302 and the contents/entries 310 of the journal page buffer 308 will no longer be available upon a power loss to the processing device). Accordingly, the processing device can use (1) snapshots of the L2P table 302 and (2) journal pages from the journal page buffer 308 that will be stored in non-volatile memory to reconstruct the L2P table 302 upon recovery from a power loss event.

At operation 210, the processing device detects/determines if an event has occurred to cause the processing device to write the contents of the journal page buffer 308 to non-volatile memory (sometimes referred to as a journal page buffer event). For example, (1) in response to the journal page buffer 308 reaching a predefined size (e.g., 16 kilobytes); (2) in response to the passage of a predefined period of time (e.g., one minute); or (3) in response to a predefined number of memory access operations (e.g., one thousand), the processing device can determine that an event has occurred to cause the processing device to write the contents of the journal page buffer 308 to non-volatile memory. In response to the processing device detecting an event has occurred to cause the processing device to write the contents of the journal page buffer 308 to non-volatile memory, the method 200 moves to operation 212.

At operation 212, the processing device writes the contents/entries 310 of the journal page buffer 308 to non-volatile memory. As described above, the contents/entries 310 of the journal page buffer 308 are written to non-volatile memory as journal pages (i.e., each write of the contents/entries 310 of the journal page buffer 308 is a separate journal page) and journal pages represent changes to the L2P table 302 since the last snapshot of the L2P table 302 was written/stored to non-volatile memory. Since the contents/entries 310 of the journal page buffer 308 have been written to non-volatile memory, the contents/entries 310 of the journal page buffer 308 can be cleared/erased from the journal page buffer 308.

In response to the processing device not detecting at operation 210 that an event has occurred to cause the processing device to write the contents of the journal page buffer 308 to non-volatile memory or following operation 212, the method 200 moves to operation 214. At operation 214, the processing device detects/determines if an event has occurred to cause the processing device to write a snapshot of one or more zones 314 of the contents/entries 304 of the L2P table 302 to non-volatile memory (sometimes referred to as a snapshot event). For example, in response to (1) the elapse of a predefined time period and/or (2) a predefined number of changes to one or more zones 314 of the L2P table 302, the processing device can determine that an event has occurred to write the contents of the L2P table 302, in their entirety, to non-volatile memory. In response to the processing device detecting an event has occurred to cause the processing device to write one or more zones 314 of the L2P table 302 to non-volatile memory, the method 200 moves to operation 216.

Figure 4A:
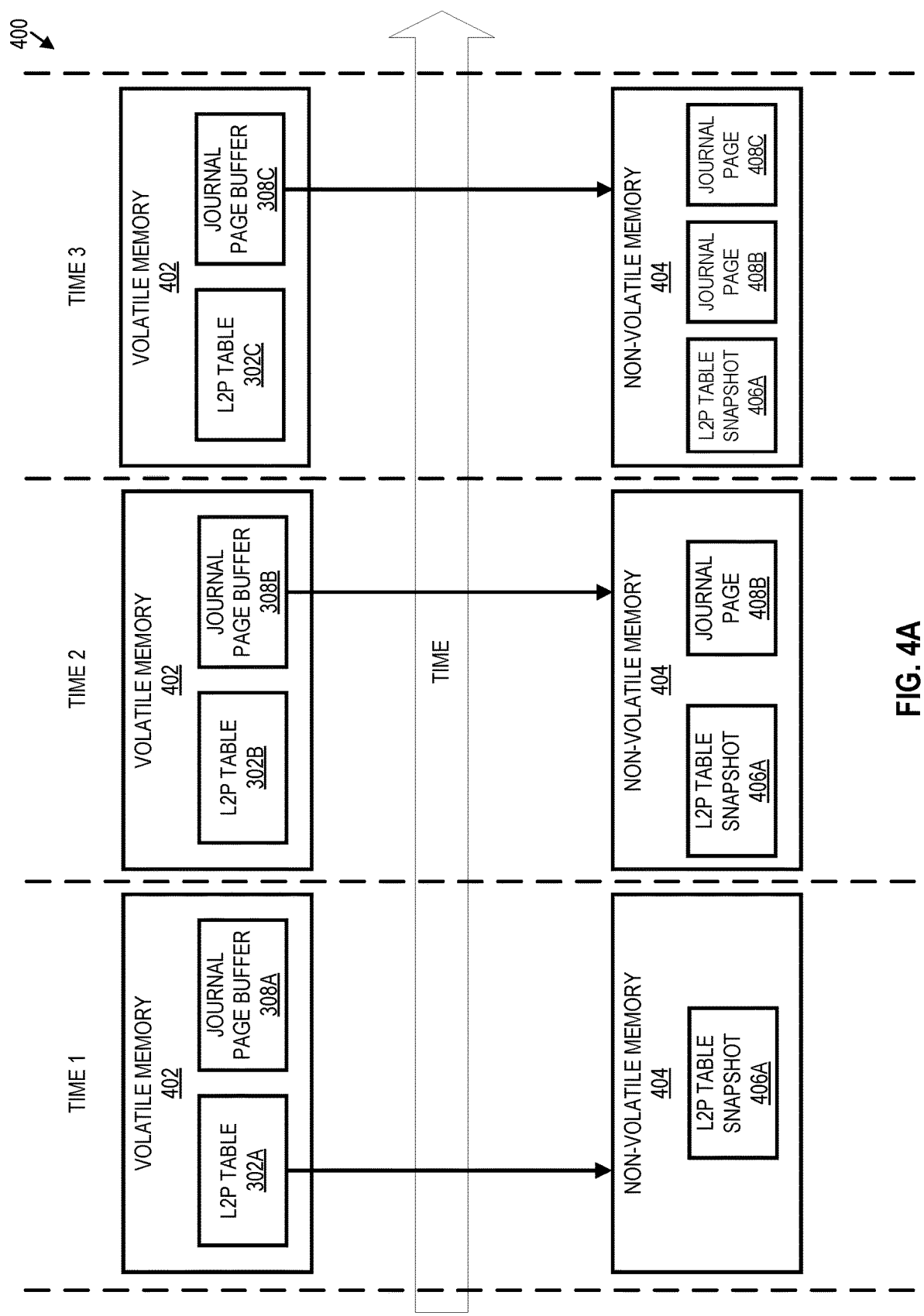
FIGS. 4A and 4B show a timeline in which snapshots of an L2P table and journal pages of a journal page buffer are written from volatile memory to non-volatile memory, in accordance with some embodiments of the present disclosure.
Figure 4B:
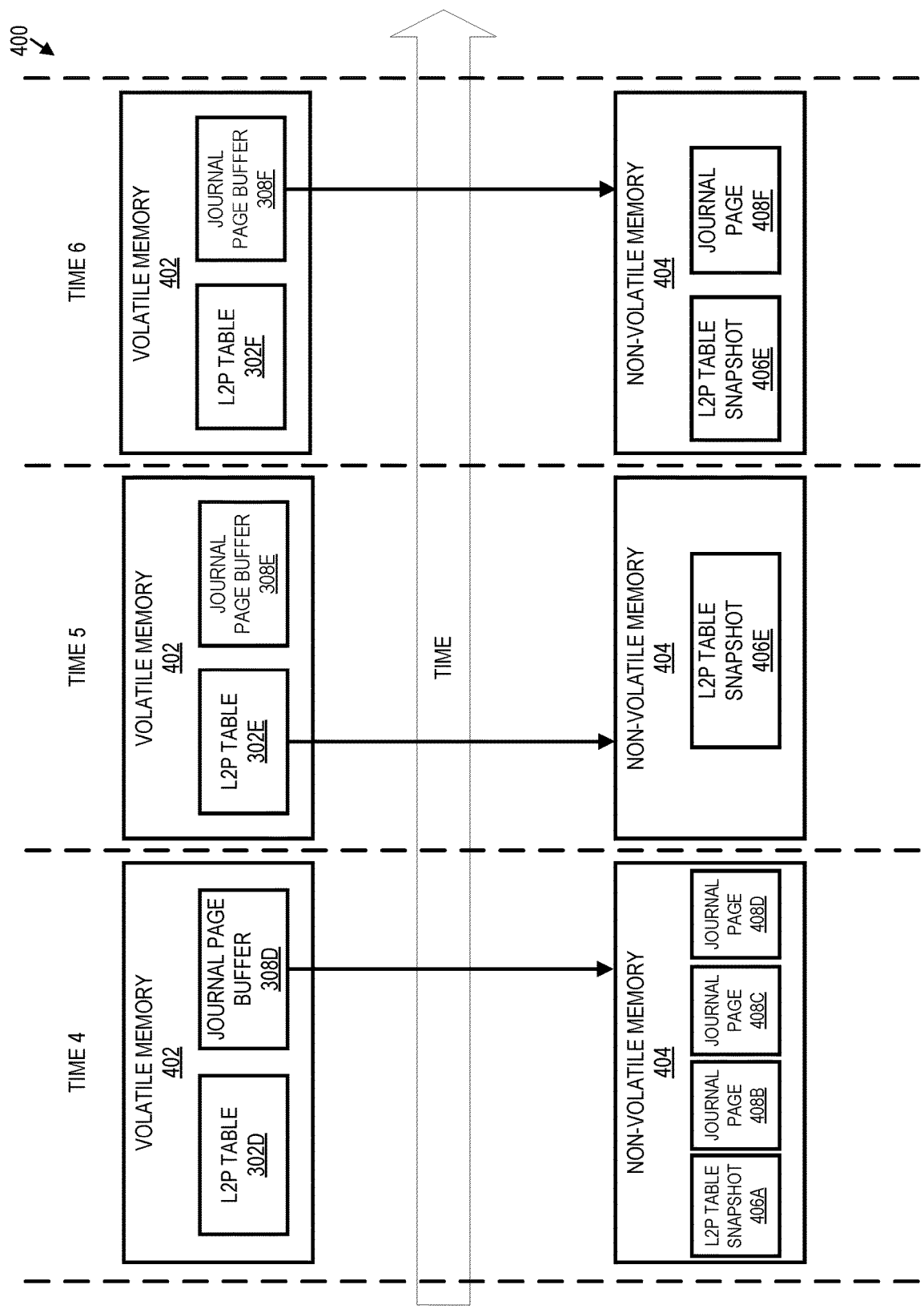

At operation 216, the processing device writes one or more zones 314 of the L2P table to non-volatile memory. FIGS. 4A and 4B show a timeline 400 in which snapshots 406 of the L2P table 302 and journal pages 408 of the journal page buffer 308 are written from volatile memory 402 to non-volatile memory 404. For example, as shown in FIG. 4A, at time 1, the volatile memory 402 includes a first version of the L2P table 302A, which includes a first set of L2P entries 304 (zero or more L2P entries 304), and a first version of the journal page buffer 308A, which includes a first set of journal entries 310 (zero or more journal entries 310). At time 1, the processing device detects (i.e., detects at operation 214) an event has occurred to write a snapshot of one or more zones 314 of the contents of the first version of the L2P table 302A to non-volatile memory 404 (e.g., all zones 314 of the L2P table 302A). Accordingly, the processing device writes the L2P table snapshot 406A to the non-volatile memory 404. The L2P table snapshot 406A can include L2P entries 304 of all the zones 314 of the L2P table 302 (i.e., each L2P entry 304 in the L2P table 302) or a subset of the zones 314 of the L2P table 302 (i.e., only L2P entries 304 of some zones 314 of the L2P table 302). For example, the event detected by the processing device at operation 214 can be relative to a single zone 314 in the L2P table 302 (e.g., (1) separate timers are kept for each zone 314 and only a timer of a single zone 314 has expired or (2) separate change counters are kept for each zone 314 and only a change counter for a single zone 314 has reached a threshold value) or all zones 314 in the L2P table 302 (e.g., (1) a single timer is kept for all zones 314 and this timer has expired or (2) a single change counter is kept for all zones 314 in the L2P table 302 and this change counter has reached a threshold value). Accordingly, the L2P table snapshot 406A can represent all zones 314 in the L2P table 302 or a subset of the zones 314 in the L2P table 302. Since the entirety of the L2P table 302 has been written to non-volatile memory 404, the journal page buffer 308 can be cleared.

As also shown in FIG. 4A, at time 2 the volatile memory 402 includes a second version of the L2P table 302B, which includes a second set of L2P entries 304 (zero or more L2P entries 304), and a second version of the journal page buffer 308B, which includes a second set of journal entries 310 (zero or more journal entries 310). In this example, at time 2 the processing device detects (i.e., detects at operation 210) an event has occurred to cause the processing device to write the contents/entries 310 of the journal page buffer 308 to non-volatile memory 404. Accordingly, the processing device writes the journal page 408B to the non-volatile memory 404. The journal page 408B includes all journal entries 310 in the journal page buffer 308 at time 2 and, when combined with the L2P table snapshot 406A, represents an accurate/complete view of each entry 304 in the L2P table 302B at time 2. Since the entirety of the journal page buffer 308B is stored in non-volatile memory 404, the journal page buffer 308 can be cleared at time 2 (i.e., upon the processing device writing a journal page 408B to non-volatile memory 404 at operation 212, the processing device can clear the journal page buffer 308).

At time 3 the volatile memory 402 includes a third version of the L2P table 302C, which includes a third set of L2P entries 304 (zero or more L2P entries 304), and a third version of the journal page buffer 308C, which includes a third set of journal entries 310 (zero or more journal entries 310). In this example, at time 3 the processing device again detects (i.e., detects at operation 210 during another run through the method 200) an event has occurred to cause the processing device to write the contents/entries 310 of the journal page buffer 308 to non-volatile memory 404. Accordingly, the processing device writes the journal page 408C to the non-volatile memory 404. The journal page 408C includes all journal entries 310 in the journal page buffer 308C at time 3 and, when combined with the L2P table snapshot 406A and the journal page 408B, represents an accurate/complete view of each entry 304C in the L2P table 302C at time 3. Again, since the entirety of the journal page buffer 308C is stored in non-volatile memory 404, the journal page buffer 308 can be cleared at time 3 (i.e., the processing device can clear the journal page buffer 308C at or following the completion of operation 212).

As shown in FIG. 4B, at time 4 the volatile memory 402 includes a fourth version of the L2P table 302D, which includes a fourth set of L2P entries 304 (zero or more L2P entries 304), and a fourth version of the journal page buffer 308D, which includes a fourth set of journal entries 310 (zero or more journal entries 310). In this example, at time 4 the processing device again detects (i.e., detects at operation 210 during another run through the method 200) an event has occurred to cause the processing device to write the contents/entries 310 of the journal page buffer 308 to non-volatile memory 404. Accordingly, the processing device writes the journal page 408D to the non-volatile memory 404. The journal page 408D includes all journal entries 310 in the journal page buffer 308D at time 4 and, when combined with the L2P table snapshot 406A, the journal page 408B, and the journal page 408C, represents an accurate/complete view of each entry 304 in the L2P table 302D at time 4. Again, since the entirety of the journal page buffer 308D is stored in non-volatile memory 404, the journal page buffer 308 can be cleared at time 4 (i.e., the processing device can clear the journal page buffer 308D at or following the completion of operation 212).

At time 5, the volatile memory 402 includes a fifth version of the L2P table 302E, which includes a fifth set of L2P entries 304 (zero or more L2P entries 304), and a fifth version of the journal page buffer 308E, which includes a fifth set of journal entries 310 (zero or more journal entries 310). At time 5, the processing device detects (i.e., detects at operation 214) an event has occurred to cause the processing device to write a snapshot of one or more zones 314 of the contents of the fifth version of the L2P table 302E to non-volatile memory 404. Accordingly, the processing device writes the L2P table snapshot 406E to the non-volatile memory 404. Similar to the L2P table snapshot 406A, the L2P table snapshot 406E can include entries 304 of all the zones 314 of the L2P table 302 (i.e., each entry 304 in the L2P table 302) or a subset of the zones 314 of the L2P table 302 (i.e., only entries 304 of some zones 314 of the L2P table 302). In the example shown in FIG. 4B, the L2P table snapshot 406E includes L2P entries 304 of all zones 314. Since the non-volatile memory 404 stores entries 304 of all zones 314 of the L2P table 302, the L2P table snapshot 406E by itself represents an accurate/complete view of each entry 304 in the L2P table 302E at time 5. Accordingly, each of the previous L2P table snapshots 406 (e.g., the L2P table snapshot 406A) and each journal page 408 (e.g., the journal pages 408B-408D) can be erased/removed from the non-volatile memory 404. Furthermore, since the entirety of the L2P table 302 is stored in non-volatile memory 404, the journal page buffer 308 can be cleared at time 5 (i.e., the processing device can clear the journal page buffer 308E at or following the completion of operation 214).

At time 6 the volatile memory 402 includes a sixth version of the L2P table 302F, which includes a sixth set of L2P entries 304 (zero or more L2P entries 304), and a sixth version of the journal page buffer 308F, which includes a sixth set of journal entries 310 (zero or more journal entries 310). In this example, at time 6 the processing device again detects (i.e., detects at operation 210 during another run through the method 200) an event has occurred to cause the processing device to write the contents/entries 310 of the journal page buffer 308 to non-volatile memory 404. Accordingly, the processing device writes the journal page 408F to the non-volatile memory 404. The journal page 408F includes all journal entries 310 in the journal page buffer 308F at time 6 and, when combined with the L2P table snapshot 406E, represents an accurate/complete view of each entry 304 in the L2P table 302F at time 6. Again, since the entirety of the journal page buffer 308 is stored in non-volatile memory 404, the journal page buffer 308 can be cleared at time 6 (i.e., the processing device can clear the journal page buffer 308F at or following the completion of operation 212).

In the example timeline 400 shown in FIGS. 4A and 4B, each of the six versions of the L2P table 302A-302F is described as including separate sets of L2P entries 304 and each of the six versions of the journal page buffer 308A-308F is described as including separate sets of journal entries 310. These separate sets of entries 304 and 310 describe changes to the L2P table 302 over time. Thus, some entries 304 between versions of the L2P table 302 may be identical while others are different.

Returning to the method 200, in response to the processing device not detecting an event has occurred to cause the processing device to write the contents of the L2P table 302 to non-volatile memory or following operation 216, the method 200 moves to operation 218. At operation 218, the processing device determines if an event has been detected to cause the processing device to reconstruct the L2P table 302. For example, an event that would trigger the processing device to reconstruct the L2P table 302 can be the processing device regaining power after either an intentional or unintentional complete loss of power. In response to the processing device not detecting an event that would trigger the processing device to reconstruct the L2P table 302, the method 200 returns to operation 202 for the processing device to again detect a memory operation that identifies a logical address. Conversely, in response to the processing device detecting an event that would trigger the processing device to reconstruct the L2P table 302, the method 200 moves to operation 220.

At operation 220, the processing device writes the most recent snapshot 406 for each zone 314 stored in non-volatile memory 404 to corresponding locations/zones 314 of the L2P table 302 in volatile memory 402. For example, when a single L2P table snapshot 406 stores the complete L2P table 302 (i.e., L2P entries 304 for all zones 314), the processing device writes this single L2P table snapshot 406 to the L2P table 302 in volatile memory 402. However, when zones 314 are spread across multiple L2P table snapshots 406 stored in non-volatile memory 404, the processing device writes each zone 314 to corresponding positions in the L2P table 302 stored in volatile memory 402.

Figure 5A:
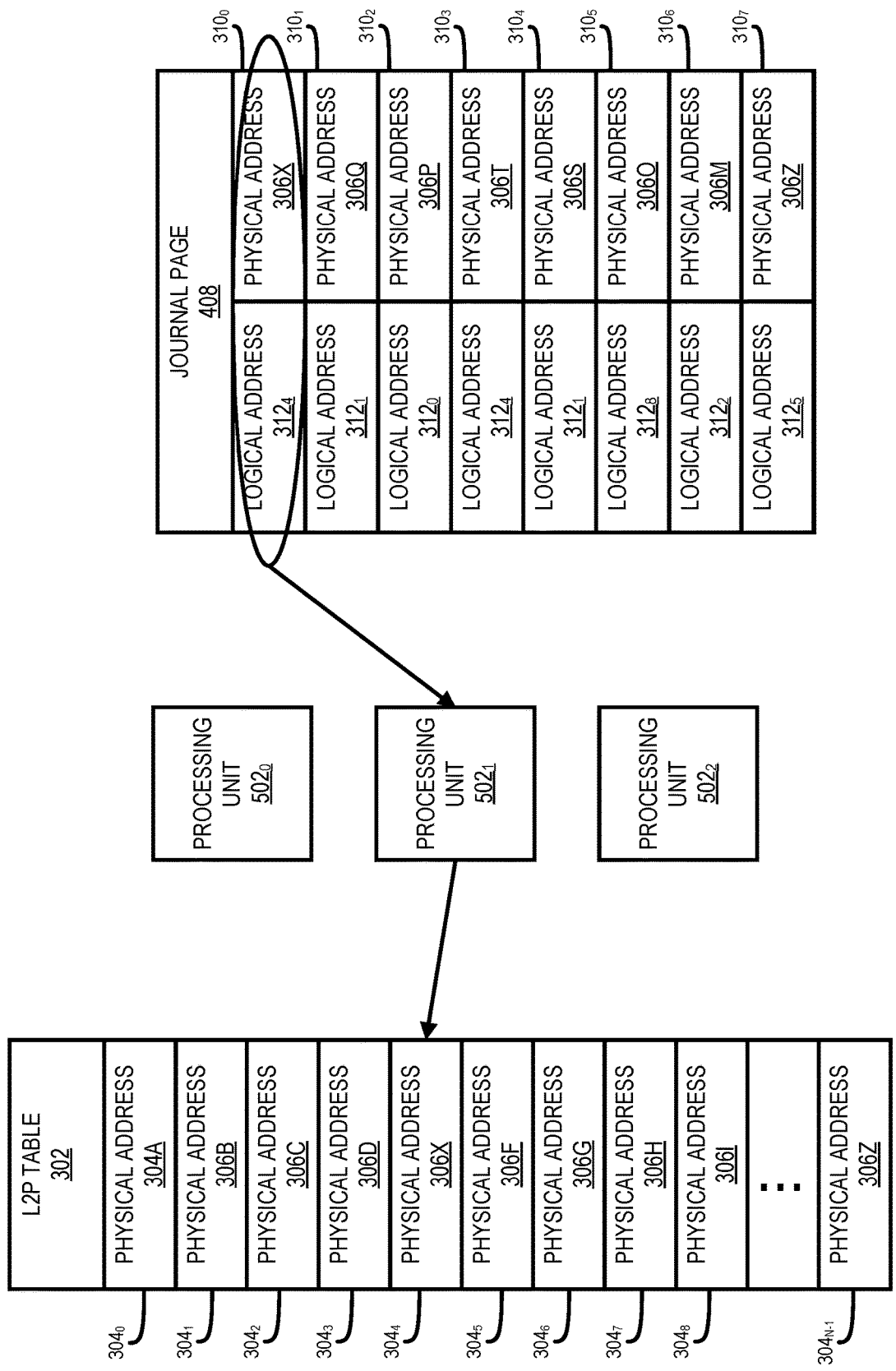
FIGS. 5A-5C show a set of processing units updating an L2P table based on a set of journal entries of a journal page, in accordance with some embodiments of the present disclosure.

At operation 222, the processing device updates each zone 314 of the L2P table 302 using journal pages 408 stored in non-volatile memory 404, if any. In one embodiment, operation 222 is performed by a set of processing units (e.g., processors and/or cores of a processor) of the processing device. For example, FIG. 5A shows a set of processing units $502_0$-$502_2$ that are each assigned to or otherwise associated with separate zones 314 in the L2P table 302. In this configuration, each processing unit $502_0$-$502_2$ parses/replays each entry 310 in the journal pages 408 but only updates a corresponding/assigned zone 314 of the L2P table 302. For instance, in one embodiment, each processing unit $502_0$-$502_2$ determines a zone 314 in the L2P table for each entry 310 in a journal page 408 stored in non-volatile memory 404 at sub-operation 222A. In one embodiment, this determination at sub-operation 222A can be based on Equation 1, which was described above. In particular, each processing unit $502_0$-$502_2$ applies the logical address 312 of each journal entry 310 to Equation 1 (based on a predetermined chunk size (e.g., four) and number of zones (e.g., three) to arrive at a zone number for each logical address 312 and corresponding journal entry 310. At sub-operation 222B, each processing unit $502_0$-$502_2$ updates L2P entries 304 based on journal page entries 310 determined at sub-operation 222A to be assigned to their zone 314.

For example, FIG. 5A shows the set of processing units $502_0$-$502_2$ updating the L2P table 302 based on a set of journal entries $310_1$-$310_7$ of the journal page 408. In particular, the processing units $502_0$-$502_2$ are updating the L2P table 302 based on the first journal entry $310_0$ of the journal page 408. In this example, the processing unit $502_0$ is assigned to zone $314_0$, the processing unit $502_1$ is assigned to zone $314_1$, and the processing unit $502_2$ is assigned to zone $314_2$. As shown in FIG. 5A, the first journal entry $310_0$ corresponds to the logical address $312_4$. Applying Equation 1 to the logical address $312_4$ (i.e., using the value "4" as the logical address value in Equation 1), the processing units $502_0$-$502_2$ determine that this logical address $312_4$ corresponds to zone $314_1$ (i.e., zone 1) which can also be seen in FIG. 3B. Accordingly, the processing unit $502_1$, which is assigned to zone $314_1$, updates the physical address 306 of the entry 304 in the L2P table 302 corresponding to logical address $312_4$ (i.e., the entry $304_4$) with the physical address 306 indicated in the journal entry $310_0$ (i.e., the L2P entry $304_4$ is updated to include/reference the physical address 306X as indicated by the journal entry $310_0$).

Figure 5B:
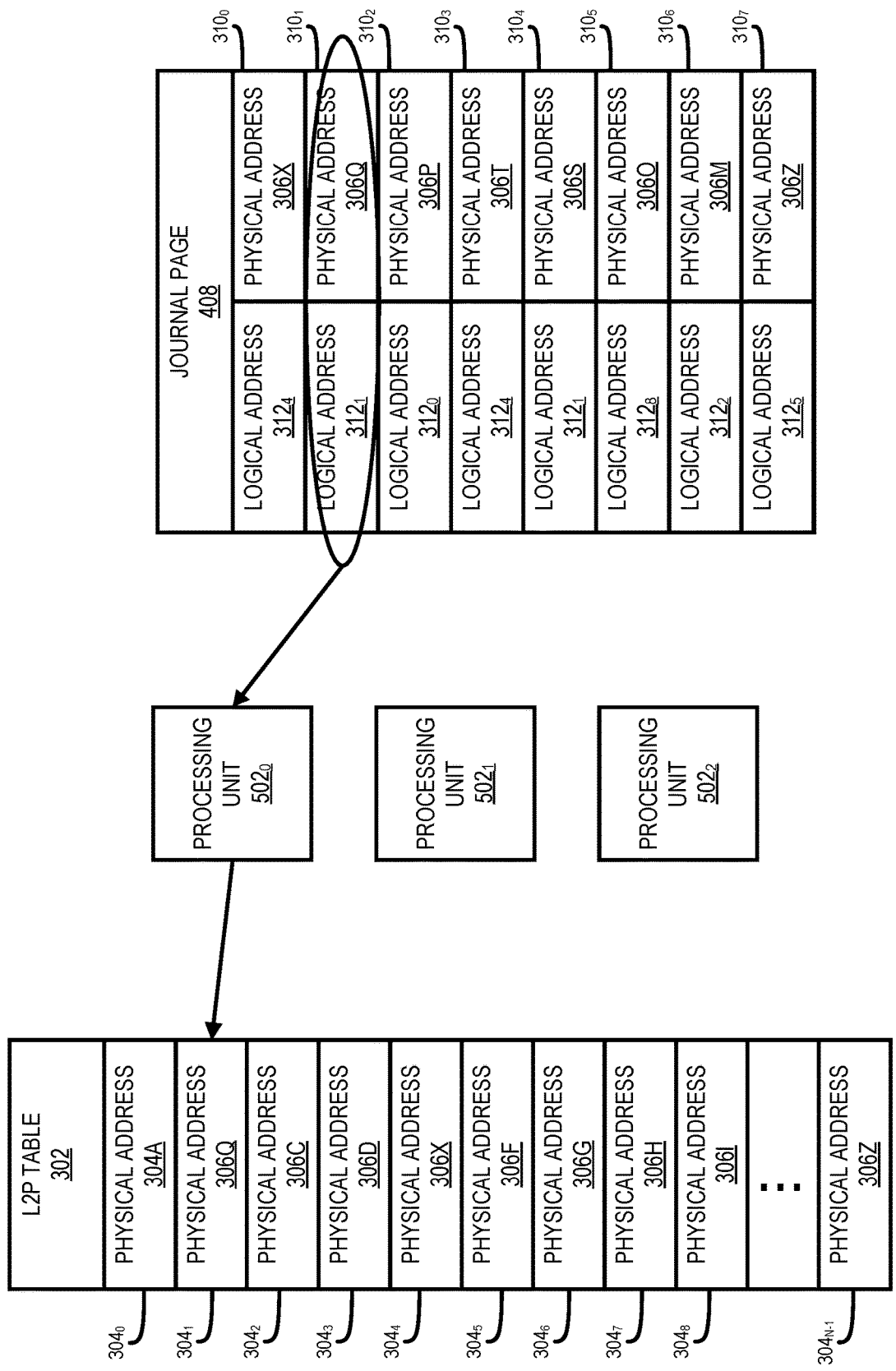

FIG. 5B shows the processing units $502_0$-$502_2$ updating the L2P table 302 based on the second journal entry $310_1$ of the journal page 408. As shown in FIG. 5A, the first journal entry $310_0$ corresponds to the logical address $312_1$. Applying Equation 1 to the logical address $312_4$ (i.e., using the value "4" as the logical address value in Equation 1), the processing units $502_0$-$502_2$ determine that this logical address $312_1$ corresponds to zone $314_0$ (i.e., zone 0) which can also be seen in FIG. 3B. Accordingly, the processing unit $502_0$, which is assigned to zone $314_0$, updates the physical address 306 of the entry 304 in the L2P table 302 corresponding to logical address $312_1$ (i.e., the entry $304_1$) with the physical address 306 indicated in the journal entry $310_1$ (i.e., the L2P entry $304_4$ is updated to include/reference the physical address 306Q as indicated by the journal entry $310_1$).

Figure 5C:
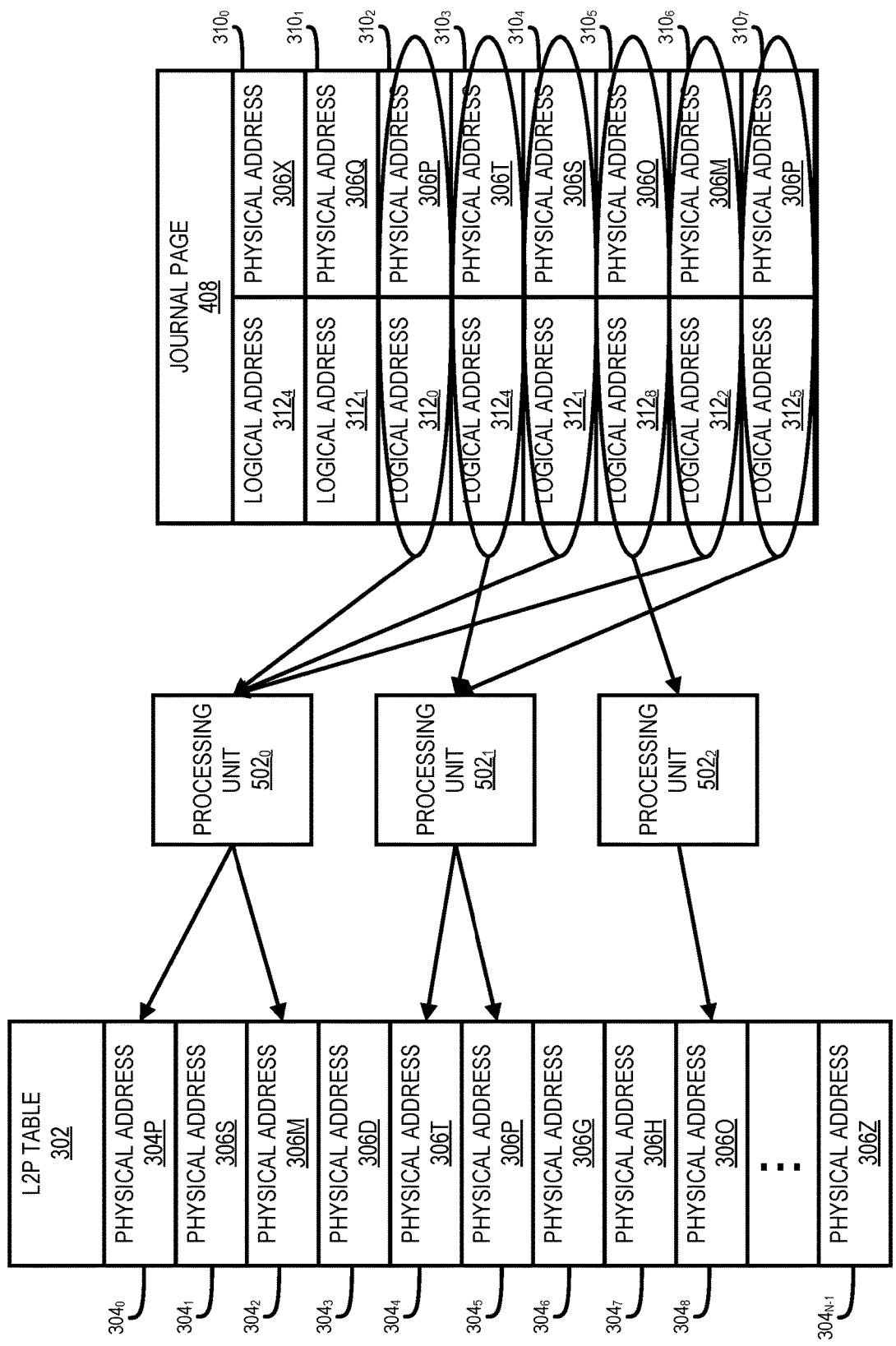

Similarly, FIG. 5C shows the update of the L2P table 302 for the remaining journal entries $310_2$-$310_7$ by corresponding processing units $502_0$-$502_2$ based on the determined zone 314 assigned to each processing unit $502_0$-$502_2$ and to each logical address 312/journal entry 310. In particular, the processing unit $502_0$ updates the L2P table 302 with the journal entries $310_2$, $310_4$, and $310_6$; the processing unit $502_1$ updates the L2P table 302 with the journal entries $310_3$ and $310_7$; and the processing unit $502_2$ updates the L2P table 302 with the journal entry $310_5$.

In some embodiments, the non-volatile memory 404 includes no journal pages 408 or journal pages 408 with no journal page entries 310 (e.g., at time 1 and time 5 in the example shown in FIG. 4A and FIG. 4B). In these embodiments, operation 222 is not performed as the L2P table 302 has been entirely updated based on L2P table snapshot(s) 406 at operation 220.

As described above, the processing device divides the L2P table 302 using an at least a partially non-contiguous separation of logical addresses 312. Namely, (1) logical addresses 312 are assigned to zones 314 in a strict round-robin fashion such that each zone 314 contains no continuous/contiguous logical addresses 312 or (2) chunks of continuous/contiguous logical addresses 312 are assigned to zones 314 in a round-robin fashion such that, although zones 314 contain continuous/contiguous sets of logical addresses 312, zones 314 contain noncontinuous/noncontiguous sets of chunks of logical addresses 312. Accordingly, entries in journal pages are more uniformly distributed to processing units 502 during reconstruction of the L2P table 302 while still taking advantage of logical address 312 locality in the L2P table 302 during L2P table 302 reconstruction. The proposed zone 314 scheme also enables a single journal page buffer 308 to be used rather than maintaining a journal page buffer 308 per zone 314 of the L2P table 302. If a single journal page buffer 308 is used, each journal page 408 read back from non-volatile memory 404 during reconstruction of the L2P table 302 will contain an approximately equal number of entries 310 targeted at each zone 314 of the L2P table 302. Accordingly, multiple processing units 502 can read from journal pages 408 upon reconstruction of the L2P table 302 and ignore entries 310 not assigned to the processing unit 502. This approach potentially yields faster ready times for L2P tables 302 by more evenly distributing journal entries 310 among zones 314 in an L2P table 302 and to corresponding processing units 502 that can perform L2P table 302 reconstruction. Further, this approach also reduces memory requirements and the amount of data to be flushed in the event of an asynchronous power loss for journal pages 408 by enabling a single journal page buffer 308 to be used for all zones 314.

Figure 6:
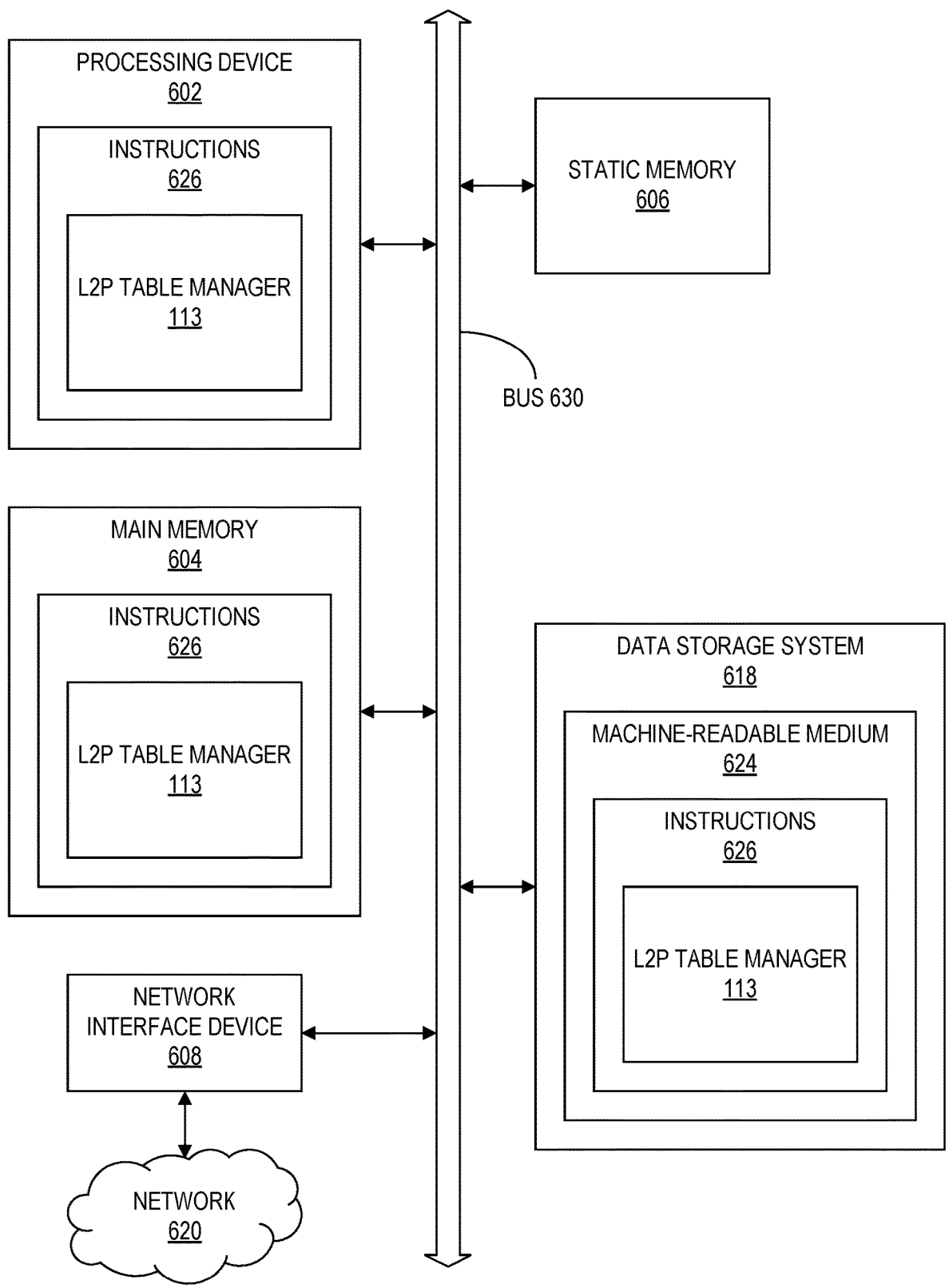
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the L2P table manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory subsystem 110 of FIG. 1.

In one embodiment, the instructions 626 include instructions to implement functionality corresponding to an L2P table manager (e.g., the L2P table manager 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. For example, a computer system or other data processing system, such as the controller 115, may carry out the computer-implemented method 200 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for managing logical-to-physical (L2P) mappings in a memory subsystem, the method comprising:
   writing, at a first time, a first set of L2P table entries from an L2P table in volatile memory of the memory subsystem to non-volatile memory as an L2P table snapshot;
   writing, at a second time, a first set of journal page buffer entries to the non-volatile memory as a first journal page based on a first set of changes to the first set of L2P table entries;
   writing, at a third time, a second set of journal page buffer entries to the non-volatile memory as a second journal page based on a second set of changes to the first set of L2P table entries;
   writing the L2P table snapshot from the non-volatile memory to the L2P table in the volatile memory of the memory subsystem; and
   updating the L2P table based on a set of journal pages from the non-volatile memory, including the first journal page and the second journal page, wherein the L2P table prior to the update includes the first set of L2P table entries from the L2P table snapshot and the L2P table includes a second set of L2P table entries following the update from the set of journal pages,
   wherein each L2P table entry in the first and second sets of L2P table entries (1) corresponds to a logical address in a set of logical addresses and (2) includes a physical address corresponding to a location in a set of memory components of the memory subsystem,
   wherein the set of logical addresses are categorized into zones from a set of zones and each processing unit in a set of processing units is assigned to a separate zone in the set of zones such that each processing unit in the set of processing units updates the L2P table entries in the first set of L2P table entries based on an assigned zone of a corresponding logical address in the set of logical addresses,
   wherein each zone in the set of zones includes at least two non-contiguous logical addresses,
   wherein the first journal page represents changes to the L2P table for a first plurality of zones in the set of zones and, along with the L2P snapshot, represents a current state of the L2P table at the second time, and
   wherein the second journal page represents changes to the L2P table snapshot for a second plurality of zones in the set of zones and, along with the L2P snapshot and the first page journal, represents a current state of the L2P table at the third time.

2. The method of claim 1, wherein each of the journal page buffer entries includes (1) a logical address from the set of logical addresses and (2) a physical address associated with the logical address of the corresponding journal page buffer entry, and
   wherein the updating the L2P table based on the set of journal pages from the non-volatile memory comprises:
      determining, by each processing unit in the set of processing units, a zone from the set of zones of each journal page buffer entry based on the logical address of the corresponding journal page buffer entry.

3. The method of claim 2, wherein the determining a zone of each journal page buffer entry is based a modulus of the logical address of the journal page buffer entry with a number of zones in the set of zones.

4. The method of claim 2, wherein the determining a zone of each journal page buffer entry is based on a chunk size of contiguous logical addresses such that a first chunk of contiguous logical addresses of the chunk size is determined to be associated with a first zone from the set of zones and a second chunk of contiguous logical addresses of the chunk size is determined to be associated with a second zone from the set of zones and the logical addresses in the first chunk are contiguous with the logical addresses in the second chunk.

5. The method of claim 4, wherein the determining a zone of each journal page buffer entry is further based on a modulus of a quotient of the logical address of the journal page buffer entry and a chunk size with a number of zones in the set of zones.

6. The method of claim 1, wherein the set of processing units includes a set of processors or a set of cores of a set of processors.

7. A system comprising:
   a volatile memory component;
   a non-volatile memory component; and a processing device, coupled to the volatile memory component and the non-volatile memory component, configured to:
- write, at a first time, a first set of logical-to-physical (L2P) table entries from an L2P table in the volatile memory component to the non-volatile memory component as an L2P table snapshot,
- write, at a second time, a first set of journal page buffer entries to the non-volatile memory component as a first journal page based on a first set of changes to the first set of L2P table entries,
- write, at a third time, a second set of journal page buffer entries to the non-volatile memory component as a second journal page based on a second set of changes to the first set of L2P table entries,
- write the L2P table snapshot from the non-volatile memory component to the L2P table in the volatile memory component, and
- update the L2P table in the volatile memory component based on a set of journal pages, including the first journal page and the second journal page, from the non-volatile memory component, wherein the L2P table prior to the update includes the first set of L2P table entries from the L2P table snapshot and the L2P table includes a second set of L2P table entries following the update from the set of journal pages,
- wherein each L2P table entry in the first and second sets of L2P table entries (1) corresponds to a logical address in a set of logical addresses and (2) includes a physical address corresponding to a location in the non-volatile memory component,
- wherein the set of logical addresses are categorized into zones from a set of zones and each processing unit in a set of processing units is assigned to a separate zone in the set of zones such that each processing unit in the set of processing units updates the L2P table entries in the first set of L2P table entries based on an assigned zone of a corresponding logical address in the set of logical addresses,
- wherein each zone in the set of zones includes at least two non-contiguous logical addresses,
- wherein the first journal page represents changes to the L2P table for a first plurality of zones in the set of zones and, along with the L2P snapshot, represents a current state of the L2P table at the second time, and
- wherein the second journal page represents changes to the L2P table snapshot for a second plurality of zones in the set of zones and, along with the L2P snapshot and the first page journal, represents a current state of the L2P table at the third time.

8. The system of claim 7, wherein each of the journal page buffer entries includes (1) a logical address from the set of logical addresses and (2) a physical address associated with the logical address of the corresponding journal page buffer entry, and
wherein the updating the L2P table based on the set of journal pages from the non-volatile memory component comprises:
determining, by each processing unit in the set of processing units, a zone from the set of zones of each journal page buffer entry based on the logical address of the corresponding journal page buffer entry.

9. The system of claim 8, wherein the determining a zone of each journal page buffer entry is based a modulus of the logical address of the journal page buffer entry with a number of zones in the set of zones.

10. The system of claim 8, wherein the determining a zone of each journal page buffer entry is based on a chunk size of contiguous logical addresses such that a first chunk of contiguous logical addresses of the chunk size is determined to be associated with a first zone from the set of zones and a second chunk of contiguous logical addresses of the chunk size is determined to be associated with a second zone from the set of zones and the logical addresses in the first chunk are contiguous with the logical addresses in the second chunk.

11. The system of claim 10, wherein the determining a zone of each journal page buffer entry is further based on a modulus of a quotient of the logical address of the journal page buffer entry and a chunk size with a number of zones in the set of zones.

12. The system of claim 7, wherein the set of processing units includes a set of processors or a set of cores of a set of processors.

13. A non-transitory computer-readable storage medium comprising instructions that, when executed by a processing device, cause a memory subsystem to:
- write, at a first time, a first set of logical-to-physical (L2P) table entries from an L2P table in volatile memory to non-volatile memory as an L2P table snapshot
- write, at a second time, a first set of journal page buffer entries to the non-volatile memory as a first journal page based on a first set of changes to the first set of L2P table entries,
- write, at a third time, a second set of journal page buffer entries to the non-volatile memory as a second journal page based on a second set of changes to the first set of L2P table entries,
- write the L2P table snapshot from the non-volatile memory to the L2P table in the volatile memory, and
- update the L2P table in volatile memory based on a set of journal pages, including the first journal page and the second journal page, from the non-volatile memory, wherein the L2P table prior to the update includes the first set of L2P table entries from the L2P table snapshot and the L2P table includes a second set of L2P table entries following the update from the set of journal pages,
- wherein each L2P table entry in the first and second sets of L2P table entries (1) corresponds to a logical address in a set of logical addresses and (2) includes a physical address corresponding to a location in the non-volatile memory,
- wherein the set of logical addresses are categorized into zones from a set of zones and each processing unit in a set of processing units is assigned to a separate zone in the set of zones such that each processing unit in the set of processing units updates the L2P table entries in the first set of L2P table entries based on an assigned zone of a corresponding logical address in the set of logical addresses, and
- wherein each zone in the set of zones includes at least two non-contiguous logical addresses,
- wherein the first journal page represents changes to the L2P table for a first plurality of zones in the set of zones and, along with the L2P snapshot, represents a current state of the L2P table at the second time, and
- wherein the second journal page represents changes to the L2P table snapshot for a second plurality of zones in the set of zones and, along with the L2P snapshot and the first page journal, represents a current state of the L2P table at the third time.

14. The non-transitory computer-readable storage medium of claim 13, wherein each of the journal page buffer entries includes (1) a logical address from the set of logical addresses and (2) a physical address associated with the logical address of the corresponding journal page buffer entry, and
    wherein the updating the L2P table based on the set of journal pages from the non-volatile memory comprises:
        determining, by each processing unit in the set of processing units, a zone from the set of zones of each journal page buffer entry based on the logical address of the corresponding journal page buffer entry.

15. The non-transitory computer-readable storage medium of claim 14, wherein the determining a zone of each journal page buffer entry is based on a chunk size of contiguous logical addresses such that a first chunk of contiguous logical addresses of the chunk size is determined to be associated with a first zone from the set of zones and a second chunk of contiguous logical addresses of the chunk size is determined to be associated with a second zone from the set of zones and the logical addresses in the first chunk are contiguous with the logical addresses in the second chunk,
    wherein the determining a zone of each journal page buffer entry is further based on a modulus of a quotient of the logical address of the journal page buffer entry and a chunk size with a number of zones in the set of zones.

\* \* \* \* \*